US 12,487,966 B2

United States Patent
Kumar et al.

(10) Patent No.: US 12,487,966 B2
(45) Date of Patent: Dec. 2, 2025

(54) DYNAMIC FILE SELECTION PROCESS TO TRANSFER REQUIRED DATA FILE BETWEEN DIFFERENT SERVERS IN NEAR REAL-TIME

(71) Applicant: Bank of America Corporation, Charlotte, NC (US)

(72) Inventors: Vishwamohan Kumar, Gautam Buddha Nagar (IN); Ranjeeta Errala, Waxhaw, NC (US); Linda Mock, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 250 days.

(21) Appl. No.: 17/990,356

(22) Filed: Nov. 18, 2022

(65) Prior Publication Data
US 2024/0168916 A1 May 23, 2024

(51) Int. Cl.
*G06F 16/00* (2019.01)
*G06F 16/11* (2019.01)
*G06F 16/16* (2019.01)
*G06F 16/182* (2019.01)

(52) U.S. Cl.
CPC .......... *G06F 16/119* (2019.01); *G06F 16/162* (2019.01); *G06F 16/166* (2019.01); *G06F 16/183* (2019.01)

(58) Field of Classification Search
CPC .... G06F 16/119; G06F 16/162; G06F 16/166; G06F 16/183; G06F 16/16
See application file for complete search history.

(56) References Cited

U.S. PATENT DOCUMENTS

| | | |
|---|---|---|
| 6,006,238 A | 12/1999 | Packard |
| 6,110,223 A | 8/2000 | Southgate et al. |
| 6,240,486 B1 | 5/2001 | Ofek et al. |
| 7,246,105 B2 | 7/2007 | Numanoi et al. |
| 7,330,950 B2 | 2/2008 | Matsunami et al. |
| 7,912,817 B2 | 3/2011 | Love et al. |
| 7,958,093 B2 | 6/2011 | Anderson et al. |
| 8,914,330 B2 | 12/2014 | Chron et al. |
| 11,354,283 B2 | 6/2022 | Chen |
| 2004/0133650 A1* | 7/2004 | Miloushev .............. H04L 69/22 709/213 |
| 2005/0228990 A1 | 10/2005 | Kato et al. |

(Continued)

FOREIGN PATENT DOCUMENTS

CN 114513530 B * 8/2022

*Primary Examiner* — Dinku W Gebresenbet
(74) *Attorney, Agent, or Firm* — Banner & Witcoff, Ltd.

(57) ABSTRACT

Systems and methods for a file migration process for moving a plurality of files from a first group of servers to a second group of servers in near real-time are provided. The file migration process automatically and dynamically identifies each file on the first group of servers at the appropriate time and location and moves each file to a corresponding file at the second group of servers. The file migration process is initiated by obtaining several input parameters and is able to adjust to environmental changes, where the process can handle different possible scenarios. The file migration process may be partitioned into a dynamic file identification engine (module) and one or more near real-time file transfer modules that may be executed on one of the servers in the first group of servers.

20 Claims, 5 Drawing Sheets

(56) References Cited

U.S. PATENT DOCUMENTS

| | | |
|---|---|---|
| 2008/0126434 A1 | 5/2008 | Uysal et al. |
| 2009/0292790 A1 | 11/2009 | Salonikios |
| 2017/0093840 A1* | 3/2017 | Forguson ............ H04L 63/0428 |
| 2017/0206217 A1* | 7/2017 | Deshpande ............ G06N 5/045 |
| 2019/0020709 A1* | 1/2019 | Kurian .................... H04L 67/52 |
| 2019/0095506 A1* | 3/2019 | Challagolla ........... G06F 16/254 |
| 2020/0084264 A1* | 3/2020 | Staubly .................... G06F 9/54 |
| 2020/0311035 A1 | 10/2020 | Chung et al. |
| 2022/0083359 A1* | 3/2022 | MacDonald ............ G06F 30/20 |

\* cited by examiner

DYNAMIC FILE SELECTION PROCESS TO TRANSFER REQUIRED DATA FILE BETWEEN DIFFERENT SERVERS IN NEAR REAL-TIME

BACKGROUND

A software product may progress through different software phases corresponding to a development environment, testing environment, and production environment. In the production environment, a software product (for example, an application) has been delivered and needs to work flawlessly. The production environment is different from the development environment since the application is actually available for business use.

It may be necessary to migrate the software product from a source computing system to a destination computing system when the software product is in the production environment for various technical and business reasons. For example, the database technology in the destination computing system may be preferable with respect to the source computing system. However, it is important that the migration of associated files of the software product be performed in an efficient and accurate manner.

SUMMARY

Aspects of the disclosure are directed to a file migration process for transferring (migrating) a plurality of files from a first group of servers to a second group of servers in near real-time. The process supports a near real-time file transfer module that automatically and dynamically identifies each file on the first group of servers at the appropriate time and location and transfers (migrates) each file to a corresponding file at the second group of servers. The process is initiated by obtaining several input parameters and is able to adjust to environmental changes, where the process can handle different possible scenarios.

With one embodiment, the file transfer process is partitioned into a dynamic file identification module and one or more near real-time file transfer modules that are controlled via a central repository.

With one aspect of the embodiments, a file migration process (which may be referred as the dynamic file selection process) enables moving a plurality of files from a first group of servers to a second group of servers in near real-time. The file migration process automatically and dynamically identifies each file on the first group of servers at the appropriate time and location and moves each file to a corresponding file at the second group of servers. The file migration process is initiated by obtaining several input parameters and is able to adjust to environmental changes, where the process can handle different possible scenarios.

With another aspect of the embodiments, the file migration process is partitioned into a dynamic file identification module (which may be referred as the dynamic file identification engine) and one or more near real-time file transfer modules (which may be referred as the near real-time file transfer engine) that may be executed on one of the servers in the first group of servers. Each near real-time file transfer module utilizes a file transfer protocol like network data mover (NDM).

With another aspect of the embodiments, a computer platform migrates a plurality of files of a software product from a source server group to a destination server group and is responsive to at least one dynamic environmental change for a software production environment. The computer platform identifies a first required file and a second required file located at the source server group based on a first set of parameters and a second set of parameters. The computer platform passes a first set of passed parameters and a second set of passed parameters corresponding to the first and second required files, respectively, from a dynamic file identification engine to a near real-time file transfer engine. The computer platform then initiates a first instance of a file transfer of the first required file and a second instance of the file transfer of the second required file from the source server group to the destination server group and validates whether the first and second required files were transferred successfully.

With another aspect of the embodiments, a dynamic file identification engine finds all possible locations on the source server group for accessing a required file and identifies the required file based on at least one parameter.

With another aspect of the embodiments, when a dynamic file identification engine cannot identify a required file, the dynamic file identification engine obtains additional parameters for identification and repeats finding and identifying the required file.

With another aspect of the embodiments, when a dynamic file identification engine is unable to find any file at a source server group that corresponds to a required file, the dynamic file identification engine determines whether the required file has been renamed. When the required file has been renamed, the dynamic file identification engine repeats the finding and the identifying for the renamed file.

With another aspect of the embodiments, a near real-time file transfer engine generates at least one file transfer parameter and transfers a required file from a source server group to a destination server group based on the generated at least one file transfer parameter.

With another aspect of the embodiments, when an error occurs with the transfer of a required file, a near real-time file transfer engine detects whether a parameter issue has occurred. If so, the near real-time file transfer engine determines and fixes a wrong parameter.

With another aspect of the embodiments, when an error occurs with the transfer of a required file, a near real-time file transfer engine detects whether a connectivity issue has occurred. If so, the near real-time file transfer engine initiates another instance of a transfer of the required file.

With another aspect of the embodiments, when a validation of a transferred file is unsuccessful, a near real-time file transfer engine deletes a corresponding transferred file and initiates another instance of the file transfer.

With another aspect of the embodiments, a computer platform schedules a file migration process over a first time duration to migrate a first subset of the plurality of migrated files and subsequently schedules the file migration process over a second duration to migrate a second subset of the plurality of migrated files, where the first and second time durations are non-overlapping.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

With one aspect of the embodiments, a file migration process (which may be referred as the dynamic file selection process) is supported for moving a plurality of files from a first group of servers to a second group of servers in near real-time. The file migration process automatically and dynamically identifies each file on the first group of servers at the appropriate time and location and moves each file to a corresponding file at the second group of servers. The file migration process is initiated by obtaining several input parameters and is able to adjust to environmental changes, where the process can handle different possible scenarios.

With another aspect of the embodiments, the file migration process is partitioned into a dynamic file identification module (which may be referred as the dynamic file identification engine) and one or more near real-time file transfer modules (which may be referred as the near real-time file transfer engine) that may be executed on one of the servers in the first group of servers. Each near real-time file transfer module utilizes a file transfer protocol, like network data mover (NDM).

These and other features are described in further detail below.

Figure 1:
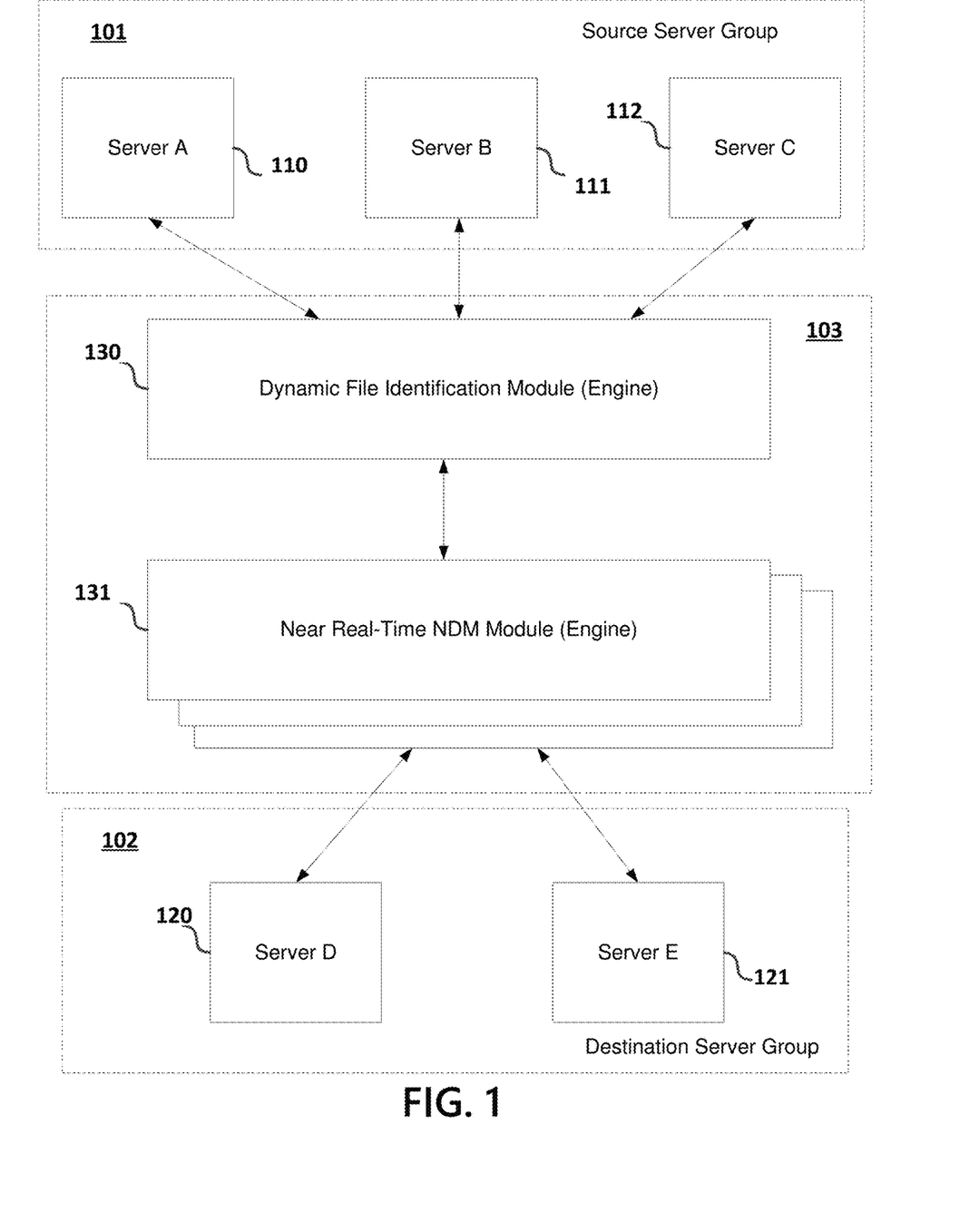
FIG. 1 depicts an illustrative computing environment for supporting file migration from a source server group to a destination server group in accordance with one or more example embodiments.

FIG. 1 illustrates two computing systems, where production files are migrated from a first group of servers (shown as the source server group) to a second group of servers (shown as the destination server group).

There may be various reasons for migrating the production files, which may span hundreds of files and may be associated with a software application. For example, it may be desirable to utilize a different database system such as from a relational database (often using Structured Query Language (SQL)) to a distributed file system such as a Hadoop Distributed File System (HDFS). As another example, it may be desirable to change operating systems, for example from UNIX to Linux, for technical or licensing reasons.

In order to complete the migration of files during the production phase, each existing file on the source server group is validated with the migrated file generated on the destination server group. One aspect of the embodiments is locating the right (required) file to transfer from the source server group to the destination server group for comparison. This aspect addresses several considerations:

1. Multiple versions of the same file present on the server on different locations.
2. A file can move to different locations on the source server and can also be renamed in its lifecycle.
3. The transfer may include a large number of files (for example, hundreds). Each file may have different criteria for selecting the right file.
4. Creation of one job per migrated file may be problematic. Many of these jobs may fail in the production phase due to various reasons, which in turn may create unnecessary production incidents and impact production stability metrics.
5. A single file migration process may handle all the files with minimal user input and handle any ongoing production issues (such as a file being delayed, not generated for that day, or any unplanned outage) to avoid any failures in production.
6. At any moment, it may be required to move multiple files in near real-time. Any delays may impact the product parallel validation.
7. The dynamic nature of file migration process corresponds to the requirement of determining when and where to access the right file.
8. The file migration process may be running multiple times for the same file, and each time the file name may be different.

Figure 2:
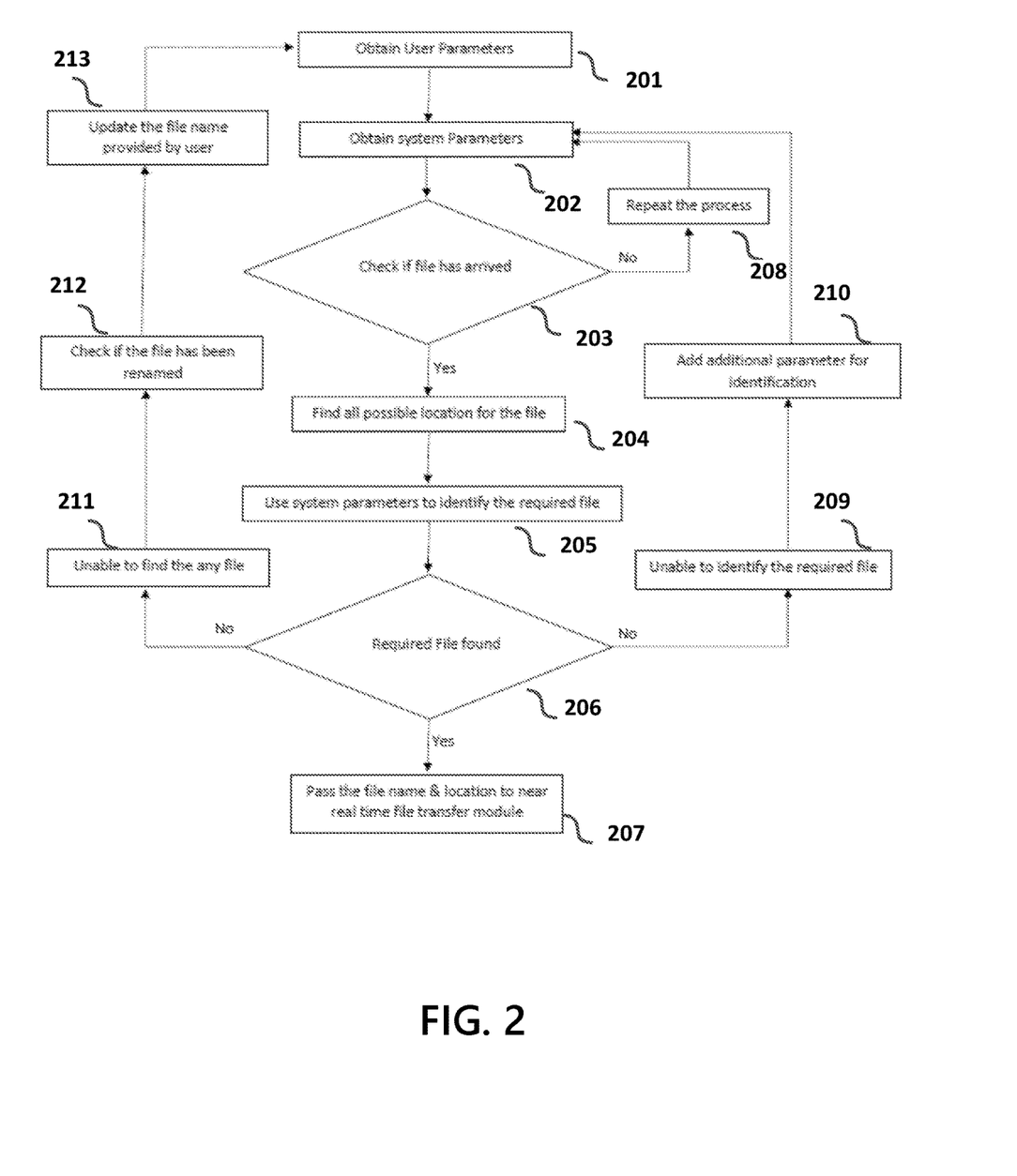
FIG. 2 depicts a flowchart for a dynamic file identification module (engine) that the computer system shown in FIG. 1 may execute to identify files at the source server group in accordance with one or more example embodiments.
Figure 3:
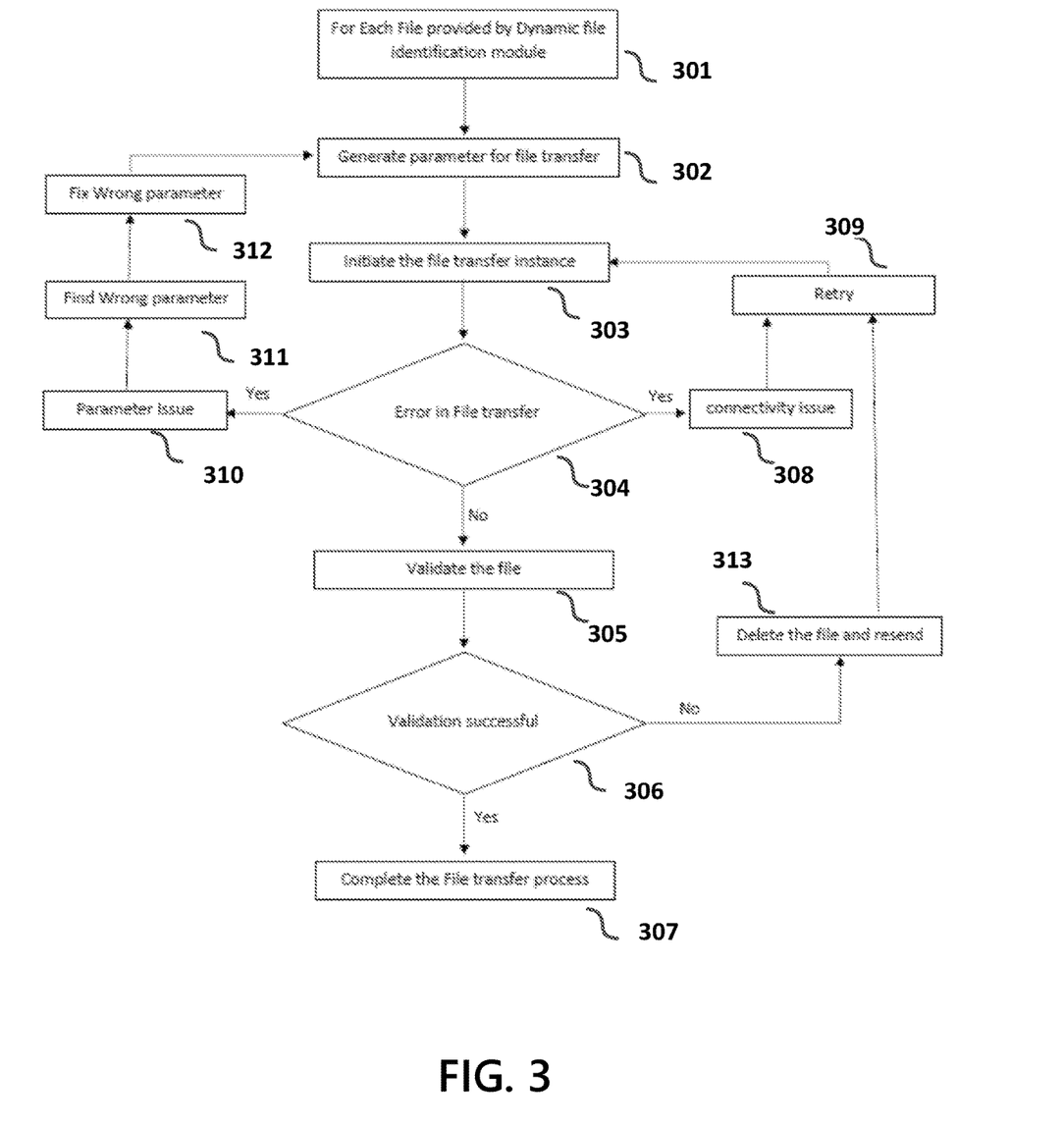
FIG. 3 depicts a flowchart for a near real-time file transfer module (engine) that the computer system shown in FIG. 1 may execute to transfer files from the source server group to the destination server group in accordance with one or more example embodiments.

In order to address the above considerations, a file migration process shown in FIGS. 2 and 3 is executed by a computing platform. Typically, the computing platform may be supported by a server in the source server group. However, with some embodiments, the computing platform may be supported by a computing entity that is separate from the source server group or the destination server group.

The file migration process may dynamically identify the right (required) file and handle every possible scenario which can occur in live production. The file migration process automates the entire process of file selection and near real-time file movement, where a plurality of files is migrated from the source server group to the destination server group over a migration time duration. For example, the file migration process may be scheduled to execute on a time interval (for example, starting every 15 minutes) when a subset of the files to be migrated is expected to be available. The time interval can be adjusted so that the files are transferred in near real-time while transferring all of the files from the source server group to the destination server group. In other words, by reducing the time between scheduling the file migration process, real-time performance for file migration may be improved. The file migration process can be then scheduled for a subsequent time interval (after the previous file transfer has been completed) to transfer another subset of the plurality of files. In other words, there is typically only one instance of the file migration process executing at a given time.

The file migration process is provided basic information to start execution and is able to handle different possible scenarios and avoid any failures due to environmental issues as discussed below.

The file migration process may handle any number of files as per scheduling and continue sending them multiple times without any manual intervention during the prod parallel validation period.

The file migration process may be controlled via a central repository, so the user can control this process to add, modify, or remove files as needed.

There may be numerous efficiency benefits of the file migration process shown in FIGS. 2 and 3. First, the file migration process eliminates the need to create a separate file transfer job for each file. Second, the production environment may change very quickly so that a static job cannot handle those changes that may result in production job failures. Third, to handle any such failure with a static job, a change request (CRQ) is typically needed to update the static job. This traditional approach introduces additional time that may result in missing the service level agreement (SLA) to move the file. Consequently, it is advantageous to partition the file migration process into two sub-processes: the dynamic file identification module and one or more instances of the near real-time file transfer module. The sub-processes, may execute 24×7 in order to ensure that files are migrated in near real-time.

With some embodiments, the file migration process may be initiated to transfer all of the files that are to be migrated during the migration time duration from the source server group to the destination server group.

File migration for an application may encompass many files. As an example, hundreds of files have to be migrated for a given software product. File migration may span a fairly long duration (for example, over a work-day) with respect to a creation and availability of a particular file. With some embodiments, file migration may be partitioned into file subsets since different files may be available at different times spanning the migration time duration. Consequently, the file migration process does not need to be executed over the entire migration time duration, thus possibly saving computing resources. Continuing the example, a first subset of the files is transferred when those corresponding files are expected to be available (for example, by executing the file migration process between 0800 and 0815). Subsequently, second subset of the files is transferred when those corresponding files are expected (for example, by executing the file migration process between 1000 and 1015). The file migration process may be scheduled throughout the migration time duration at appropriate times until all of the files have been migrated to the destination server group, where only one instance of the file migration process executes at a given time. As will be discussed in further detail, the file migration process may invoke multiple instances of the near real-time file transfer module.

FIG. 2 shows a flowchart for the dynamic file identification module (engine). The dynamic file identification module obtains multiple user and system provided parameters to decide the right (required) file name. Because the production environment may change very rapidly, with traditional approaches a regular file transfer job typically cannot handle those changes that may result in production job failures. In accordance with an aspect of the embodiments, the dynamic file identification module may adapt as per the changes and avoid any production failure.

The dynamic file identification module is able to handle every conceivable scenario that may occur in a live production scenario. To achieve the near real-time file transfer, the file migration process dynamically generates one or more file transfer parameters to adapt to the environmental changes. The file migration process automates the entire process of file selection and near real-time file transfer. Users typically only need to provide a few basic details to start this process. The process then handles different possible scenarios and avoids any failure due to environmental issues.

The file migration process can handle any number of files and keeps sending them multiple times without any manual intervention during the prod parallel validation period and may be controlled via a central repository to provide better control to add and/or remove files as needed.

Referring back to FIG. 2, each of the files that are migrated is normally processed at steps 201-207 based on user and system parameters obtained at steps 201-202, where no issues are detected.

User parameters, as obtained at step 201, may include:
Expected File name(s)/File pattern(s)
List of source server(s)
Expected file location(s)
File location sequence
Expected file generation time
Job name consuming the file
System parameters, as obtained at step 202, may include:
Source server status (up/down)
Server resource status (Any slowness)
File consuming job status
File delay information When the specified file has arrived, as determined at step 203, all possible locations of the file are determined at step 204 since different versions of the file may reside at different locations of the source server group. The dynamic file identification module uses the system parameters at step 205 to determine the required file (version). For example, the dynamic file identification module may use the creation date of the different versions and select the version with the latest date as the required file. As another example, system parameters may include:
List of all the file available on the source server
Time of generation for all the files
Location of the files
List of scripts modifying the file If the required file is found, as determined at step 206, the dynamic file identification module passes the file name and location of the required file to the near real-time file transfer module (engine).

However, issues may be detected when the dynamic file identification module is executing steps 201-206. The flowchart in FIG. 2 addresses two issues: 1) unable to identify the required file and 2) unable to find any file.

When the dynamic file identification module is unable identify the required file at step 209 based on user and system parameters (for example, there are multiple file versions), the dynamic file identification module adds additional parameters at step 210 to identify the required file and repeats steps 202-206. For example, the additional parameters at step 210 may include:
File location
File name
File location sequence
Timing change When the dynamic file identification module is unable to find any file based on user and system parameters at step 211, the dynamic file identification module may generate an inquiry through the user interface about whether the file has been renamed at step 212. If so, steps 201-206 are repeated.

When the required file is found, as discussed above, the dynamic file identification module passes the file name and location of the required file to the near real-time file transfer module (engine) as shown in FIG. 3.

FIG. 3 shows a flowchart for the near real-time file transfer module (engine). An instance of the near real-time file transfer module is initiated for each file to be migrated from the source server group to the destination server group based on the file name and location of the required file provided by the dynamic file identification module. When the dynamic file identification module has identified a plurality of files to be migrated (transferred) (for example, 700 files), multiple instances of the near real-time file transfer module may be initiated (for example, 700 instances).

The near real-time file transfer module may utilize a file transfer protocol, like network data mover (NDM) utility, to implement any of the steps shown in FIG. 3.

At step 301, the near real-time file transfer module obtains the file name and location of the file on the source server group (for example, the server ID and directory name) from the dynamic file identification module for a given file to be migrated. Typically, when the file is moved from the source server group to the destination server group, the file is copied on the destination server group while the original copy of the file remains on the source server group.

The near real-time file transfer module generates a file transfer parameter(s) at step 302 and initiates file transfer from the source server group to the destination server group at step 303. For example, the source of the file may be specified by a source server ID, directory name, and file name and the destination of the file may be specified by the destination server ID, directory name, and file name. As another example, file transfer parameters may include:
- Source file name
- Source server file location
- Target server name
- Target file name
- Target server file location If no transfer error is detected at step 304, the file is validated at step 305. For example, a transferred file may be validated if the file size of source and target files match. If the validation is unsuccessful, steps 313 and 309 are executed so that steps 303-306 can be repeated.

If a transfer error is detected at step 308, the file transfer retry is initiated at step 309 and steps 303-306 are repeated.

If a parameter error is detected at step 310, the parameter issue is resolved at steps 311-312 and steps 302-306 are repeated. Examples of parameter errors are:
- Wrong source file name/File not available
- Wrong source server file location
- Wrong target server name
- Wrong target file name
- Wrong target server file location The dynamic file identification module is able to handle various possible scenarios such as scenarios 1-3.

With scenario 1, the required file was found without any issue and real time file transfer is executed correctly. Scenario 1 corresponds to a file transfer without any issues, either in identifying source file or transferring the files to the destination server group. The following steps are performed during scenario 1.
- Step 1: User provides file name.
- Step 2: All the system parameters are collected for the required file
- Step 3: Process waits for the defined file arrival time; once arrived it executes next step to find the file.
- Step 4: One or more files are found on different location of the server.
- Step 5: In case of multiple files, file selection algorithm identifies the required file.
- Step 6: File name is passed to near real-time file transfer module.
- Step 7: Near real-time transfer module generates the parameters needed to transfer the file.
- Step 8: A new instance of near real-time file transfer module is created to initiate the file transfer for the given file.
- Step 9: Once the file transfer is completed, the process validates the file.

With scenario 2, the required file is not found anywhere on the system. The following steps are performed during scenario 2.
- Step 1: User provides file name.
- Step 2: All the system parameters are collected for the required file.
- Step 3: Process waits for the defined file arrival time; once arrived it executes the next step to find the file.
- Step 4: No files were found anywhere on the server group.
- Step 5: Check if the file has been renamed after arrival. If so, update the file name (user input may be needed).
- Step 6: Use the updated file name to find the file.
- Step 7: One or more files were found on different location of the server group.
- Step 8: In case of multiple files, file selection algorithm identifies the required file.
- Step 9: File name is passed to near real-time file transfer module.
- Step 10: Near real-time file module generates the parameters needed to transfer the file.
- Step 11: A new instance of near real-time file transfer module is created to initiate the file transfer.
- Step 12: Once the file transfer is completed, the process validates the file.

With scenario 3, multiple files are found, and the file migration process is not able to identify the required file.
- Step 1: User provides file name.
- Step 2: All the system parameters are collected for the required file
- Step 3: Process waits for the defined file arrival time; once arrived it executes the next step to find the file.
- Step 4: Multiple files were found on the server.
- Step 5: File selection algorithm is not able to identify the required file.
- Step 6: Gather additional system parameter to identify the required file (user input may be needed).
- Step 7: Re-run the file selection algorithm with additional parameters.
- Step 8: File selection algorithm identifies the required file.
- Step 9: File name is passed to near real-time file transfer module.
- Step 10: Near real-time file transfer module generates the parameters needed to transfer the file.
- Step 11: A new instance of near real-time file transfer module is created to initiate the file transfer.
- Step 12: Once the file transfer is completed, the process validates the file.

The near real-time file transfer module is able to handle various possible error scenarios such as scenario 4.

With scenario 4, the required file was found without any issue, but the near real-time file transfer module had some issues.

Step 1: User provides file name.

Step 2: All the system parameters are collected for the required file.

Step 3: Process waits for the defined file arrival time; once arrived it executes the next step to find the file.

Step 4: One or more files were found on different location of the server.

Step 5: In case of multiple files, the file selection algorithm identifies the required file.

Step 6: File name is passed to near rear-time file transfer module.

Step 7: Near real-time file transfer module generates the parameters needed to transfer the file.

Step 8: A new instance of near real-time file transfer module is created to initiate the file transfer.

Step 9: File transfer failed due to parameter/connectivity issues.

Step 10: Issue is identified and fixed (if needed) and file transfer is re-initiated (user input may be needed).

Step 11: Once the file transfer is completed, the process validates the file.

Figure 4:
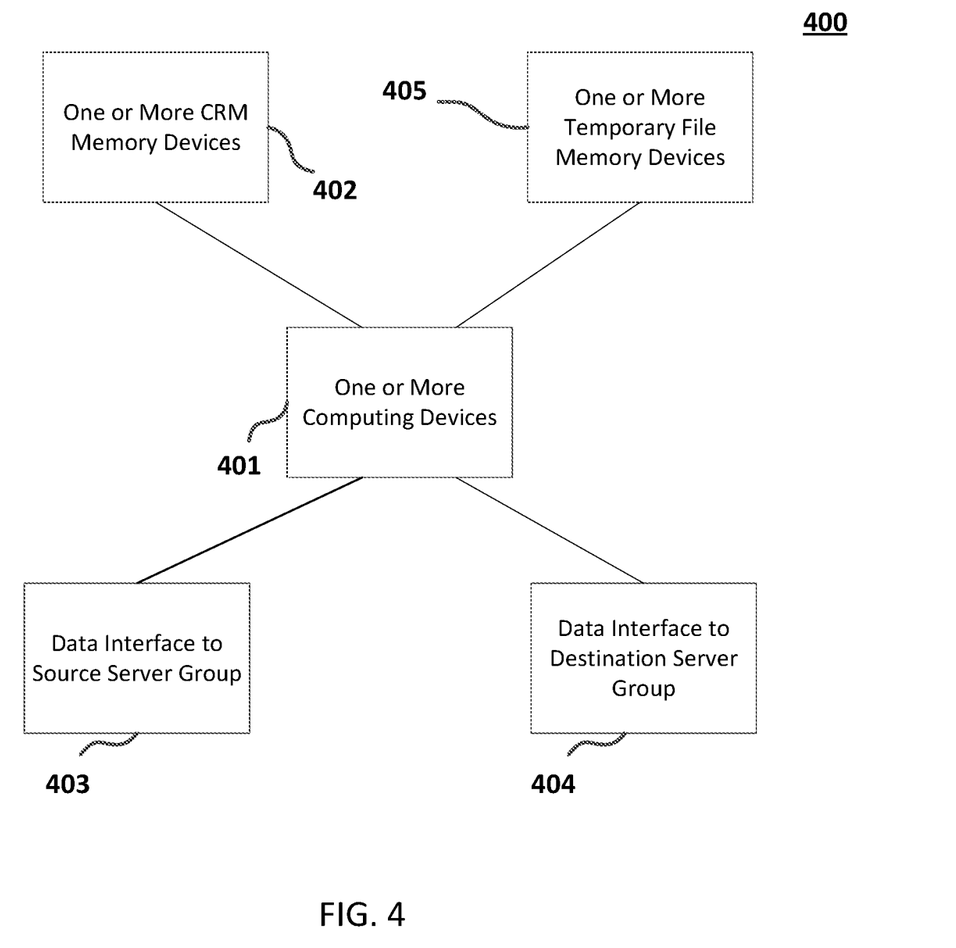
FIG. 4 depicts an apparatus for supporting a computer platform that executes the dynamic file identification module and the near real-time file transfer module shown in FIGS. 2 and 3, respectively, in accordance with one or more example embodiments.

FIG. 4 shows computing platform 400 that supports transferring files from the source group of servers to the destination group of shown in FIG. 1 in accordance with one or more example embodiments.

Computing platform 400 includes one or more computing devices 401 that executes computer-readable instructions stored at memory device 402 in order to execute processes shown in FIGS. 2 and 3.

Computing platform 400 transfers a plurality of files from the source server group via data interface 403 to the destination server group via data interface 404. Computer platform 400 may temporarily buffer one or more of the plurality of files at memory device 405 while the plurality of files are being transferred from the source server group to the destination server group.

Figure 5:
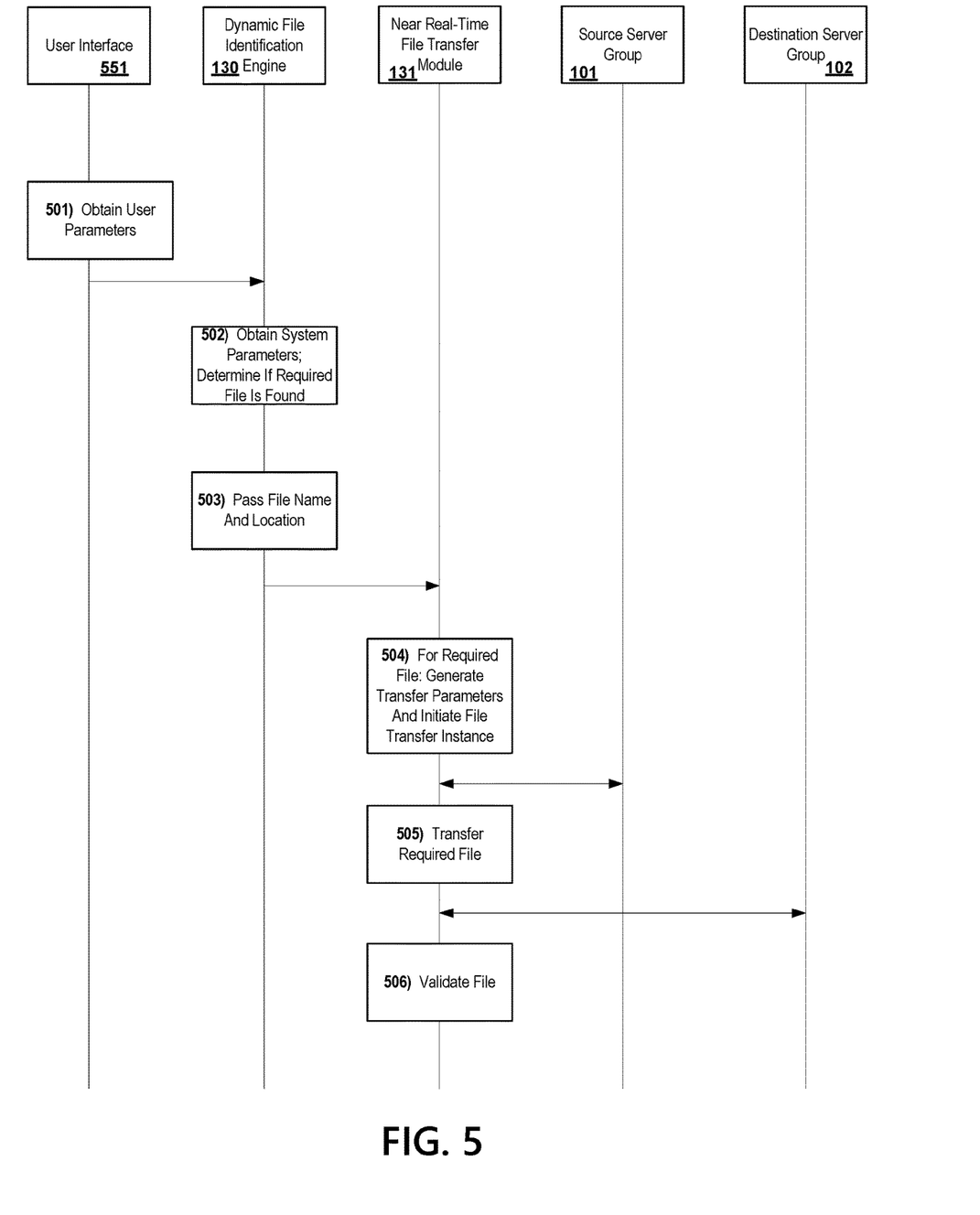
FIG. 5 depicts an illustrative event sequence for migrating one or more files from a source server group to a destination server group in accordance with one or more example embodiments.

FIG. 5 depicts an illustrative event sequence for migrating one or more files from a source server group to a destination server group based on the flowcharts shown in FIGS. 2 and 3. While the event sequence depicts the migration process for a specified file, similar processing is performed for all of the files to be migrated.

At block 501, computing platform 400 obtains one or more user parameter from user interface 551 to initiate a file migration process. At block 502, dynamic file identification engine 130 obtains system parameters for the files to be migrated, including for the specified file.

Dynamic file identification engine 130 determines if the specified file has arrived at the source server group and finds the specified file at all possible locations at the source server group. For example, different versions of the specified file may be stored on the source server group. Dynamic file identification engine 130 determines the required file from the different file versions, for example, based on the most recent date of the file. However, other criteria may be used such as the file owner or other file attributes.

At block 503, dynamic file identification engine 130 passes the file name and location of the required file to near real-time file transfer engine 131. However, as previously discussed, dynamic file identification engine 130 may be unable to find the required file, where there are multiple file versions to select from. In such a situation, dynamic file identification engine 130 obtains additional parameter to enable engine 130 to select the required file.

At block 504, near real-time file transfer engine 131 generates transfer parameters needed to execute the file transfer from the source server group to the destination server group and initiates a file transfer instance at block 505, for example, using a file transfer protocol such as network data mover (NDM), where other instances may be initiated for other files to be migrated. However, as previously discussed, if there is a detected file transfer error, near real-time file transfer engine 131 will resolve the parameter and/or connectivity issue.

At block 506, near real-time file transfer engine 131 validates the transferred file.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (for example, air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (for example, a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An apparatus for migrating a plurality of files of a software product from a source server group to a destination server group responsive to at least one dynamic environmental change for a software production environment, the apparatus comprising:
   at least one processor:
   a communication interface communicatively coupled to the at least one processor; and
   a first memory device storing computer-readable instructions that, when executed by the at least one processor, cause the apparatus to:
   identify, by a dynamic file identification engine, a first required file and a second required file located at the source server group based on a first set of system parameters and a second set of system parameters, respectively, wherein a plurality of migrated files includes the first and second required files, wherein the first set of system parameters includes a creation date and wherein identifying the first required file includes identifying the first required file from a plurality of versions of the first required file, each version stored at a different location within the source server group, the identified first required file having a most recent creation date of all versions of the first required file;
   pass, by the dynamic file identification engine to a near real-time file transfer engine, a first set of passed parameters and a second set of passed parameters corresponding to the first and second required files, respectively;
   initiate, in response to the passing to the near real-time file transfer engine, a first instance of a file transfer of the first required file and a second instance of the file transfer of the second required file from the source server group to the destination server group, wherein the first instance of a file transfer of the first required file causes a copy of the first required file to be generated at the destination server group while maintaining the first required file at the source server group; and
   validate whether the first and second required files were transferred successfully from the source server group to the destination server group, wherein validating whether the first and second required files were transferred successfully includes validating that a file size of the transferred first and second required files at the destination server group matches a file size of the first and second required files at the source server group.

2. The apparatus of claim 1, wherein the first memory device storing computer-readable instructions that, when executed by the at least one processor, further cause the apparatus to:
   find, by the dynamic file identification engine, all possible locations on the source server group for accessing the first required file; and
   identify, by the dynamic file identification engine in response to the finding, the first required file based on the first set of system parameters.

3. The apparatus of claim 2, wherein the first memory device storing computer-readable instructions that, when executed by the at least one processor, further cause the apparatus to:
   when the first required file cannot be identified, obtain additional parameters for identification; and
   repeat the finding and the identifying for the first required file.

4. The apparatus of claim 2, wherein the first memory device storing computer-readable instructions that, when executed by the at least one processor, further cause the apparatus to:
   when the dynamic file identification engine is unable to find any file at the source server group that corresponds to the first required file, determine whether the first required file has been renamed; and
   when the required file has been renamed, repeat the finding and the identifying for the renamed file.

5. The apparatus of claim 1, wherein the first memory device storing computer-readable instructions that, when executed by the at least one processor, further cause the apparatus to:
   when the first required file has not arrived, continue to monitor the source server group until the first required file arrives.

6. The apparatus of claim 1, wherein the passing includes a file name and location at the source server group for the first required file.

7. The apparatus of claim 6, wherein the source server group comprises a plurality of servers and wherein the location on the source server group is indicative of one source server within the source server group and a file directory.

8. The apparatus of claim 1, wherein the first memory device storing computer-readable instructions that, when executed by the at least one processor, further cause the apparatus to:
generate, by the near real-time file transfer engine, at least one file transfer parameter based on the first set of passed parameters; and
transfer, by the near real-time file transfer engine, the first required file from the source server group to the destination server group based on the generated at least one file transfer parameter.

9. The apparatus of claim 1, wherein the first memory device storing computer-readable instructions that, when executed by the at least one processor, further cause the apparatus to:
when an error occurs with the transfer of the first required file, detect, by the near real-time file transfer engine, whether a parameter issue has occurred; and
in response to detecting the parameter issue, determine and fix a wrong parameter.

10. The apparatus of claim 1, wherein the first memory device storing computer-readable instructions that, when executed by the at least one processor, further cause the apparatus to:
when an error occurs with the transfer of the first required file, detect, by the near real-time file transfer engine, whether a connectivity issue has occurred; and
initiate, in response to the detecting, a third instance of a second transfer of the first required file.

11. The apparatus of claim 1, wherein the first memory device storing computer-readable instructions that, when executed by the at least one processor, further cause the apparatus to:
when the validation for the first required file is unsuccessful, delete a corresponding transferred file; and
initiate a fourth instance of a third transfer of the first required file.

12. The apparatus of claim 1, wherein the near real-time file transfer engine utilizes a file transfer protocol.

13. The apparatus of claim 1, wherein the first memory device storing computer-readable instructions that, when executed by the at least one processor, further cause the apparatus to:
scheduling a file migration process over a first time duration to migrate a first subset of the plurality of migrated files, wherein the file migration process comprises a dynamic file identification sub-process and a near real-time file transfer sub-process; and
scheduling the file migration process over a second duration to migrate a second subset of the plurality of migrated files, wherein the first and second time durations are non-overlapping.

14. The apparatus of claim 1 further comprising a second memory device configured to buffer transferred data when transferring the first required file from the source server group to the destination server group.

15. A method for transferring a plurality of files from a source server group to a destination server group, the method comprising:
identifying, by a dynamic file identification engine, a first required file and a second required file located at the source server group based on a first set of system parameters and a second set of system parameters, respectively, wherein a plurality of migrated files includes the first and second required files, wherein the first set of system parameters includes a creation date and wherein identifying the first required file includes identifying the first required file from a plurality of versions of the first required file, each version stored at a different location within the source server group, the identified first required file having a most recent creation date of all version of the first required file;
passing, by the dynamic file identification engine to a near real-time file transfer engine, a first set of parameters and a second set of parameters corresponding to the first and second required files, respectively;
initiating, in response to the passing to the near real-time file transfer engine, a first instance of a file transfer of the first required file and a second instance of the file transfer of the second required file from the source server group to the destination server group, wherein the first instance of a file transfer of the first required file causes a copy of the first required file to be generated at the destination server group while maintaining the first required file at the source server group; and
validating, by the near real-time file transfer engine, whether the first and second required files were transferred successfully from the source server group to the destination server group, wherein validating whether the first and second required files were transferred successfully includes validating that a file size of the transferred first and second required files at the destination server group matches a file size of the first and second required files at the source server group.

16. The method of claim 15 further comprising:
finding, by the dynamic file identification engine, all possible locations on the source server group for accessing the first required file; and
identifying, by the dynamic file identification engine in response to the finding, the first required file based on the first set of system parameters.

17. The method of claim 16 further comprising:
when the first required file cannot be identified, obtaining additional parameters for identification; and
repeating the finding and the identifying for the first required file.

18. The method of claim 16 further comprising:
when the dynamic file identification engine is unable to find any file at the source server group that corresponds to the required file, determining whether the required file has been renamed; and
when the required file has been renamed, repeating the finding and the identifying for the renamed file.

19. One or more non-transitory computer-readable media storing instructions that, when executed by a computing platform comprising at least one processor, and memory, cause the computing platform to:
identify a first required file and a second required file located at a source server group based on a first set of system parameters and a second set of system parameters, respectively, wherein a plurality of migrated files includes the first and second required files, wherein the first set of system parameters includes a creation date and wherein identifying the first required file includes identifying the first required file from a plurality of versions of the first required file, each version stored at a different location within the source server group, the identified first required file having a most recent creation date of all versions of the first required file;
pass a first set of parameters and a second set of parameters corresponding to the first and second required files, respectively;

initiate, in response to the passing, a first instance of a file transfer of the first required file and a second instance of the file transfer of the second required file from the source server group to a destination server group, wherein the first instance of a file transfer of the first required file causes a copy of the first required file to be generated at the destination server group while maintaining the first required file at the source server group; and validate whether the first and second required files were transferred successfully from the source server group to the destination server group, wherein validating whether the first and second required files were transferred successfully includes validating that a file size of the transferred first and second required files at the destination server group matches a file size of the first and second required files at the source server group.

20. The one or more non-transitory computer-readable media of claim 19, wherein the instructions, when executed by the computing platform, further cause the computing platform to:

find, all possible locations on the source server group for accessing the first required file;

identify, in response to the finding, the first required file based on the first set of system parameters;

when the first required file cannot be identified, obtain additional parameters for identification; and repeat, in response to obtaining the additional parameters, the finding and the identifying for the first required file.

* * * * *